Figure 1:
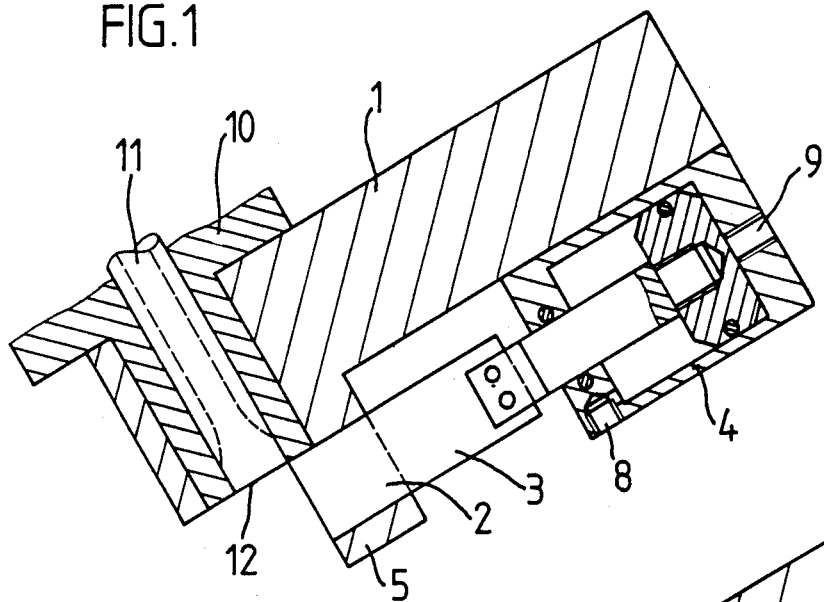

United States Patent [19]

Taubenmann

[11] Patent Number: 4,818,566
[45] Date of Patent: Apr. 4, 1989

[54] APPARATUS FOR MIXING MULTICOMPONENT PLASTICS, IN PARTICULAR POLYURETHANE

[75] Inventor: Peter Taubenmann, Munich, Fed. Rep. of Germany

[73] Assignee: Elastogran Maschinenbau GmbH, Lemfoerde, Fed. Rep. of Germany

[21] Appl. No.: 46,147

[22] Filed: May 5, 1987

[30] Foreign Application Priority Data

May 16, 1986 [DE] Fed. Rep. of Germany ....... 3616600

[51] Int. Cl.⁴ .......................... B01D 3/10; B01D 5/06
[52] U.S. Cl. ..................... 422/133; 239/502; 239/505; 261/112.1; 366/137; 366/159; 366/349; 422/310
[58] Field of Search .................. 422/131, 133, 46, 47, 422/212, 220, 310; 261/112.1; 366/137, 159; 239/502, 505; 366/349

[56] References Cited

U.S. PATENT DOCUMENTS 3,807,958  4/1974  Bramfield et al. .................... 422/47

FOREIGN PATENT DOCUMENTS 401506  11/1922  Fed. Rep. of Germany ...... 239/502
650589  3/1979  U.S.S.R. ............................. 239/502

Primary Examiner—Michael S. Marcus
Attorney, Agent, or Firm—Keil & Weinkauf

[57] ABSTRACT

The apparatus for mixing multicomponent plastics, in particular polyurethane, has a steadying attachment 1 which is arranged at the outlet orifice 12 of a mixing head 10. The steadying attachment is equipped with a plurality of lamellae 3 which are movable in the region of the emerging mixture of components and run in the direction of flow of the said mixture. Advantageously, the lamellae can be moved forward and back in a guide housing which has webs 2 which occupy the space between the lamellae and thus ensure cleaning. Steadying is achieved by greater friction with the wall and an increase in the outflow cross-section.

2 Claims, 1 Drawing Sheet

U.S. Patent

Apr. 4, 1989

4,818,566

APPARATUS FOR MIXING MULTICOMPONENT PLASTICS, IN PARTICULAR POLYURETHANE

The present invention relates to an apparatus according to the preamble of claim 1.

Apparatuses of this type are disclosed in, for example, German Patent Nos. 2,065,841 and 2,612,812 and German Laid-Open Application DOS No. 3,208,696.

These known apparatuses, which are high pressure mixing apparatuses, have restrictor and/or steadying elements which are arranged together in the mixing chamber following the entry of the components and can be moved out of the said chamber. These elements are intended on the one hand to produce a holdup which results in thorough mixing and, on the other hand, to have a steadying effect on the outlet flow, particularly when open molds are being filled. The restrictor and steadying elements must be capable of being moved out of the mixing chamber in order not to hinder the movement of a purging plunger up to the outlet orifice. Such a purging plunger is present in very many high pressure mixing apparatuses of this type, in order to effect mechanical cleaning of the mixing chamber.

These known apparatuses are not only relatively expensive but the steadying effect which they achieve is frequently unsatisfactory.

It is an object of the present invention to provide an apparatus of the type stated at the outset which, by simple constructional means, ensures good steadying of the emerging component mixture, in particular during filling of open molds.

We have found that this object is achieved by the defining clause of claim 1.

According to the invention, no measures are taken in the mixing chamber itself, but a steadying attachment is provided which can aso be mounted on existing mixing apparatuses or may be an auxiliary apparatus. The construction of this steadying attachment is relatively simple, and the said attachment can readily be mounted on the actual mixing head. The lamellae with the spaces in between steady the emerging component mixture since they provide a large surface area which ensures a high level of friction with the wall, having a braking effect. At the same time, the flow cross-section is not reduced in practice but rather increased, particularly in the region of emergence from the packet of lamellae. This reduces the flow rate. Thus, steadying is promoted by slowing down of the component mixture as a result of the high level of friction with the wall and the increase in the outflow cross-section.

An advantageous embodiment of the invention is described in claim 2. The guide housing having the webs which occupy the space between the lamellae not only reliably guides the lamellae, which can be moved forward and back, but also ensures mechanical cleaning of the lamellae during its return stroke.

The lamellae may have different forms. For example, the front edges may be bevelled or rounded. Furthermore, they may be capable of being moved a greater or lesser distance into the stream of the component mixture, so that the extent of steadying can be influenced in this way.

The invention is described below in terms of an embodiment, with reference to the drawing.

Figure 2:
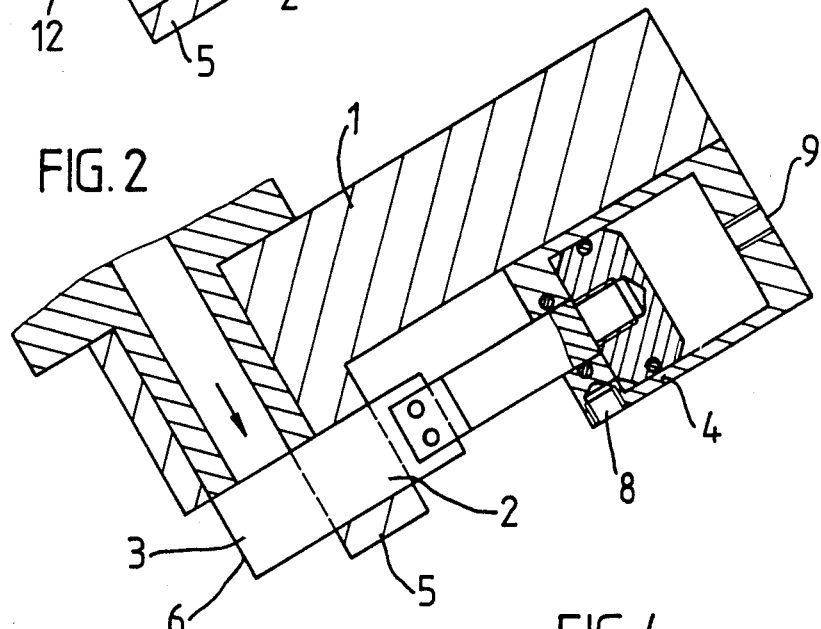
Figure 3:
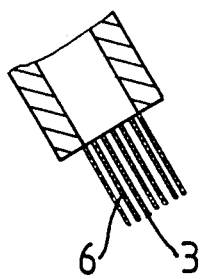
Figure 4:
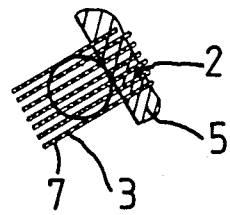

FIG. 1 shows a schematic section through an embodiment of an apparatus according to the invention in its starting or non-operating position, FIG. 2 shows a section which corresponds to that in FIG. 1 but for the operating position, i.e. during mixing of components, FIG. 3 shows a side view of the apparatus represented in FIG. 2, and FIG. 4 shows a view of FIG. 2 from below.

The apparatus shown in the drawing has a mixing head 10 of known design. The mixing head shown schematically here has a mixing chamber with inlet orifices for the plastics components and an outlet orifice for the component mixture. In the mixing chamber, a purging plunger 11 can be moved to and fro and is provided with backflow channels so that the components can flow back to the stock vessel in the non-operating or cleaning position. The outlet orifice is denoted by 12.

A steadying attachment 1 is mounted on the mixing head 10. This steadying attachment carries a number of lamellae 3 which are mounted and guided in a guide housing 5 and can be moved to and fro in the said housing. Between the lamellae 5 are webs 2 which occupy the corresponding space between the lamellae 3. The front edges of the lamellae are denoted by 6 and the lower edges by 7.

The lamellae 3 are moved by means of a hydraulic piston and cylinder unit 4. The inlet and outlet for the hydraulic control fluid are denoted by 8 and 9.

Before mixing is carried out, the apparatus is in the position shown in FIG. 1.

At the beginning of a mixing process, the purging plunger 11 is retracted so that the components can enter the mixing chamber. At the same time, the lamellae are moved from the position shown in FIG. 1, with the aid of the hydraulic piston and cylinder unit 4. The mixture of components produced in the mixing chamber passes through the outlet orifice 12 into the spaces between the lamellae 3 and emerges in the region of the front edges 6 and of the edges 7 underneath. The friction at the surfaces of the lamellae, and the larger outflow cross-section in the region of the edges 6 and 7, result in intensive steadying of the mixture of components. If it is intended to terminate a mixing process, the flow of components into the mixing chamber is stopped. This can also be effected by means of the purging plunger 11, which is moved toward the outlet orifice 12. At the same time, the lamellae 3 are retracted into the guide housing 5. The lamellae are mechanically cleaned by the webs 2.

The steadying attachment 1 can be mounted without difficulty, and this can be done subsequently, i.e. on existing mixing heads.

The apparatus is deliberately shown in an inclined position since it is advantageously arranged in this position for operation, so that the stream of mixture then passes vertically downward, virtually in the direction of the diagonals, through the lamellae and into the mold.

Of course, the invention is not restricted to the form of lamellae shown. These may also be bevelled or rounded. The shape of the webs of the guide housing 5 is then adapted accordingly. It is also possible to advance the lamellae to different extents by appropriate hydraulic control, so that the extent of steadying can be influenced in this way too.

I claim:

1. Apparatus for mixing multi-component plastics which comprises:
   a mixing chamber, said chamber including inlet orifices for passing individual components of the plastic into the chamber, and an outlet orifice for moving the mixture out of the chamber, and a steadying attachment for the mixture emerging from the mixing chamber, said attachment including a plurality of spaced lamellae which can be moved into and out of a position for receiving the mixture emerging from the chamber, said lamellae being so arranged that the mixture passes between and in contact with the lamellae when the lamellae are positioned for receiving the mixture, and a guide housing arranged adjacent to the outlet orifice in which housing the lamellae are movable, said housing including webs which occupy the spaces between lamellae.

2. Apparatus as set forth in claim 1, which includes hydraulic piston and cylinder means for moving the lamellae.

* * * * *